United States Patent
Raju et al.

(10) Patent No.: US 9,493,721 B2
(45) Date of Patent: Nov. 15, 2016

(54) METHOD TO PRODUCE METHANE RICH FUEL GAS FROM CARBONACEOUS FEEDSTOCKS USING A STEAM HYDROGASIFICATION REACTOR AND A WATER GAS SHIFT REACTOR

(75) Inventors: Arun S K Raju, Riverside, CA (US); Chan Seung Park, Yorba Linda, CA (US); Joseph M. Norbeck, Palm Desert, CA (US)

(73) Assignee: The Regents of the University of California, Oakland, CA (US)

( * ) Notice: Subject to any disclaimer, the term of this patent is extended or adjusted under 35 U.S.C. 154(b) by 723 days.

(21) Appl. No.: 13/496,296

(22) PCT Filed: Sep. 22, 2010

(86) PCT No.: PCT/US2010/049889
§ 371 (c)(1),
(2), (4) Date: May 24, 2012

(87) PCT Pub. No.: WO2011/038046
PCT Pub. Date: Mar. 31, 2011

(65) Prior Publication Data
US 2012/0222353 A1    Sep. 6, 2012

Related U.S. Application Data

(60) Provisional application No. 61/244,833, filed on Sep. 22, 2009.

(51) Int. Cl.
*C01B 3/36* (2006.01)
*C10L 3/08* (2006.01)
(Continued)

(52) U.S. Cl.
CPC .. *C10L 3/08* (2013.01); *C10J 3/00* (2013.01); *C10K 1/004* (2013.01); *C10K 3/04* (2013.01);
*C01B 2203/0283* (2013.01); *C01B 2203/04* (2013.01); *C01B 2203/047* (2013.01); *C01B 2203/048* (2013.01); *C01B 2203/0475* (2013.01); *C01B 2203/84* (2013.01); *C10J 2300/092* (2013.01); *C10J 2300/093* (2013.01); *C10J 2300/0916* (2013.01); *C10J 2300/0966* (2013.01); *C10J 2300/0973* (2013.01); *Y02P 20/145* (2015.11)

(58) Field of Classification Search
CPC .............. C10J 2300/0966; C10J 2300/0976; C01B 2203/00; C01B 2203/0827; C01B 2203/0283
See application file for complete search history.

(56) References Cited

U.S. PATENT DOCUMENTS 3,703,052 A * 11/1972 Linden .................. C10G 1/002
                                                                    208/423
3,779,725 A   12/1973 Hegarty et al.
(Continued)

OTHER PUBLICATIONS

Arun, et al., "Production of Methane Rich Fuel Gas from Coal using Steam Hydrogasiffication", 26th Annual International Pittsburgh Coal Conference, Abstract BookletSep. 20-23, 2009, Pittsburgh, PA, USA.

*Primary Examiner* — Imran Akram
(74) *Attorney, Agent, or Firm* — Fish & Tsang LLP

(57) ABSTRACT

A method for producing high levels of methane based on a combination of steam hydrogasification and a shift reactor is provided using carbonaceous material. Hydrogen produced by the shift reactor can be recycled back into the steam hydrogasifier.

10 Claims, 9 Drawing Sheets

(51) Int. Cl.
*C10J 3/00* (2006.01)
*C10K 1/00* (2006.01)
*C10K 3/04* (2006.01)

(56) References Cited

U.S. PATENT DOCUMENTS

| | | | | |
|---|---|---|---|---|
| 3,854,896 A | * | 12/1974 | Switzer | C07C 1/00 241/23 |
| 3,871,839 A | * | 3/1975 | Moody | C10J 3/46 48/197 R |
| 3,904,389 A | * | 9/1975 | Banquy | C01B 3/386 48/197 R |
| 4,152,122 A | * | 5/1979 | Feldmann | C07C 1/00 202/99 |
| 4,209,305 A | * | 6/1980 | Conway et al. | 48/213 |
| 4,597,776 A | * | 7/1986 | Ullman et al. | 48/197 R |
| 4,822,935 A | * | 4/1989 | Scott | C01B 3/382 201/2.5 |
| 2003/0130360 A1 | * | 7/2003 | Kindig | B01J 7/00 518/703 |
| 2008/0190024 A1 | * | 8/2008 | Hobbs | C10G 27/04 48/76 |
| 2009/0221721 A1 | | 9/2009 | Norbeck et al. | |
| 2011/0124749 A1 | * | 5/2011 | Abbott | C07C 29/1518 518/713 |

\* cited by examiner

METHOD TO PRODUCE METHANE RICH FUEL GAS FROM CARBONACEOUS FEEDSTOCKS USING A STEAM HYDROGASIFICATION REACTOR AND A WATER GAS SHIFT REACTOR

CROSS-REFERENCE TO RELATED APPLICATIONS

This application is a continuation-in-part of, and claims the benefit of, patent application Ser. No. 11/879,241, filed Jul. 16, 2007, which is a continuation-in-part of, and claims the benefit of, patent application Ser. No. 11/489,298, filed Jul. 18, 2006; is a continuation-in-part of, and claims the benefit of, patent application Ser. No. 10/911,348, filed Aug. 3, 2004, which is a continuation-in-part of, and claims the benefit of U.S. Pat. No. 7,208,530 which was reissued as RE40419, which claims the benefit of Provisional application 60/355,405, filed Feb. 5, 2002; is a continuation-in-part of, and claims the benefit of, patent application Ser. No. 11/879,266, filed Jul. 16, 2007, which is a continuation-in-part of, and claims the benefit of, application Ser. No. 11/489,308, filed Jul. 18, 2006; is a continuation-in-part of, and claims the benefit of, patent application Ser. No. 12/286,165, filed Sep. 29, 2008, which is a continuation-in-part of, and claims the benefit of, application Ser. No. 11/879,456 filed Jul. 16, 2007, which is a continuation-in-part of, and claims the benefit of, application Ser. No. 11/489,299 filed Jul. 18, 2006; is a continuation-in-part of, and claims the benefit of, patent application Ser. No. 12/218,653, filed Jul. 16, 2008, which is a continuation-in-part of, and claims the benefit of patent application Ser. No. 11/879,267, filed Jul. 16, 2007, which is a continuation-in-part of, and claims the benefit of, application Ser. No. 11/489,353, filed Jul. 18, 2006; and is a continuation-in-part of, and claims the benefit of, patent application Ser. No. 11/635,333, filed Dec. 6, 2006; and is a continuation-in-part of, and claims the benefit of, patent application Ser. No. 12/400,640, filed on Mar. 9, 2009.

This is application also claims benefit U.S. Provisional application 61/244,833 filed on Sep. 22, 2009 and U.S. application Ser. No. 12/783,228, filed on May 19, 2010, which claims the benefit of U.S. provisional application 61/180,010 filed on May 20, 2009.

All of the above cited applications are incorporated herein by reference in their entirety.

FIELD OF THE INVENTION

The field of the invention is the production of methane rich fuel gas.

BACKGROUND OF THE INVENTION

Natural gas accounts for approximately 20% of the world energy consumption and is the third largest used fuel after oil and coal. The United States is the second largest producer of natural gas in the world, with an annual production of 546 billion cubic meters (bcm). In addition to the domestic production, the U.S. is also the largest importer of natural gas, at 130 bcm per year. Natural gas prices have steadily increased over the past decade. Synthetic natural gas produced from coal at competitive prices will be an attractive option since this can be accomplished using domestic feedstocks.

Natural gas accounts for approximately 20% of the world energy consumption and is the third largest used fuel after oil and coal [1]. The United States is the second largest producer of natural gas in the world, with an annual production of 546 billion cubic meters (bcm). In addition to the domestic production, the U.S. is also the largest importer of natural gas, at 130 bcm per year [1]. Natural gas prices have steadily increased over the past decade. Synthetic natural gas produced from coal at competitive prices will be an attractive option since this can be accomplished using domestic feedstocks. The production of methane from coal for use as synthetic natural gas (SNG) has been studied for many years and the interest was especially high during the 1970s and 80s.

The primary thermo-chemical process used for the production of synthetic natural gas from coal was hydrogasification. Hydrogasification was originally developed in the early 1900s and there was a revived interest in the process during the 1970s and 80s as a result of increasing natural gas prices. The basic reaction is the direct methanation of carbon, as shown below [2].

$$C + 2H_2 \leftrightarrow CH_4 \quad \Delta H_{1000K} = -89.9 \text{ kJ/mol} \quad (1)$$

Although this reaction is mildly exothermic, significant amount of energy must be spent in bringing the reactants up to temperature and also to sustain the process. Methane production is favored at high pressures and the process is generally operated at temperatures ranging from 750° C. to 1000° C. [3]. A number of processes were developed and a few of these were operated satisfactorily in pilot plant scales. A major issue with hydrogasification processes was the source of hydrogen supply since hydrogen production can be expensive. Natural gas prices also dropped during this period. In addition to the hydrogen supply issues and cheap natural gas, hydrogasification was not very attractive due to the much slower reactivity of carbon with hydrogen compared to other gasifying agents. The reactivity of carbon with different species at 1073 K and 0.1 atmospheres are shown below [4].

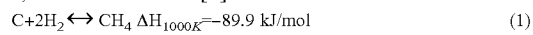

$$r_{O_2} \gg r_{H_2O} > r_{CO_2} > r_{H_2}$$
$$10^5 \quad\quad 3 \quad\quad 1 \quad\quad 3.1^{-3}$$

Oxygen or air blown processes are the primary focus of current gasification development, especially in commercial and large scale demonstration projects. The oxygen blown processes are commonly known as partial oxidation (POX) technologies and offer high carbon conversions under low residence times in the reactor. However, these processes generate a synthesis gas (syngas) with very low methane content. Hence, these processes can be used for methane production only by means of downstream methanation. Methanation processes are not considered to be an effective means of synthetic natural gas production due to different reasons including relatively poor efficiency under desired process conditions [5].

Based on the above discussions, it is evident that for SNG production to be commercially viable, the gasification process must solve the two major technical problems faced by conventional hydrogasification processes and methanation process. These problems are the difficulties in the supply of hydrogen in an inexpensive and simple manner and also the low carbon conversions observed during conventional hydrogasification based processes.

BRIEF SUMMARY OF THE INVENTION

This invention provides a process for providing a high concentration methane, between 0.2 to 60% on a mole basis, where conventional problems associated with hydrogen supply and low carbon conversions are overcome.

In one embodiment of the invention, a process for converting carbonaceous material into methane-rich fuel gas is provided involving simultaneously heating in a hydrogasification reactor the carbonaceous material in the presence of both hydrogen and steam, at a temperature and pressure sufficient to generate a stream of methane and carbon monoxide rich product gas, In more particular embodiments, the carbonaceous material is provided in slurry form.

In another embodiment, the process further includes feeding the product gas to a shift reactor, wherein the CO rich gas product reacts with steam to produce $H_2$. In a more particular embodiment, the hydrogen produced by the shift reactor is recycled back into the hydrogasification reactor.

In yet other embodiments, catalysts, hot solid, or injection of oxygen into the hydrogasifier is not required.

The composition of the product gas from steam hydrogasification reaction can be controlled by varying the steam to carbon and the $H_2$ to carbon ratio of the feed. The carbonaceous material used in the invention can be but not limited to municipal waste, biomass, wood, coal; high ash coal, biosolids, or a natural or synthetic polymer; or commingled mixtures thereof.

In another embodiment, an apparatus for converting carbonaceous material into methane-rich fuel gas is provided including a steam hydrogasification reactor and a shift reactor. In a more particular embodiment, a gas clean-up unit is also provided.

BRIEF DESCRIPTION OF THE DRAWINGS

The following figures are merely examples and should not be used to limit the claims.

DETAILED DESCRIPTION OF THE INVENTION

Figure 1:
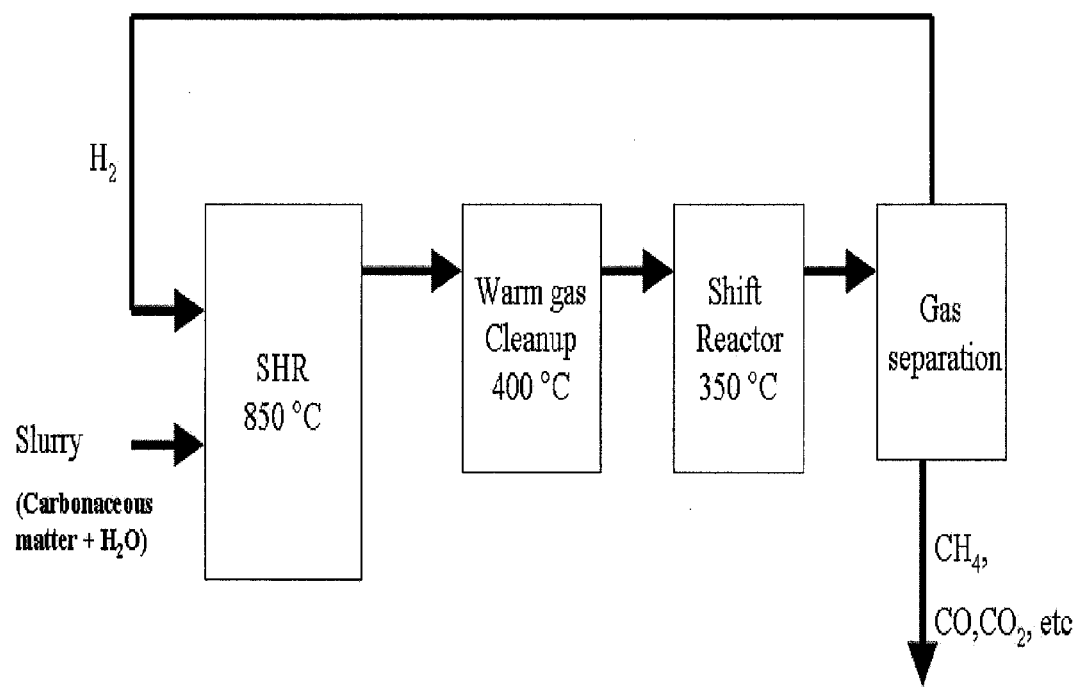
FIG. 1 shows the process configuration involving the innovative SHR gasification to produce a high methane containing syngas.
Figure 2:
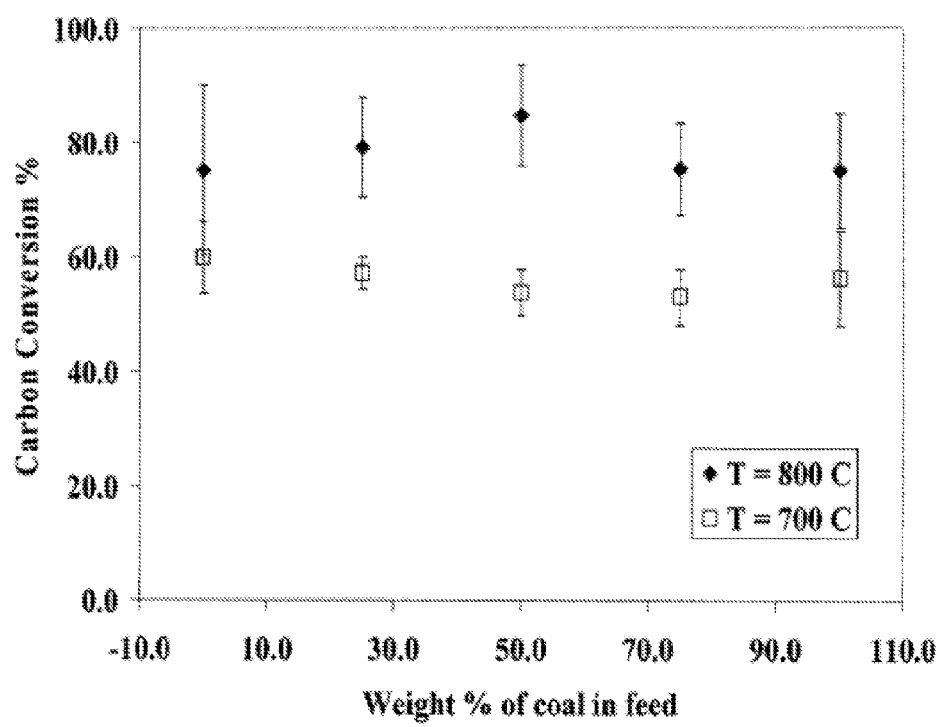
FIG. 2 shows a graph of carbon conversion.

The new SNG production technology that is the topic of this paper is based on a combination of hydrogasification and steam pyrolysis reactions, and is called steam hydrogasification reaction (SHR) [6, 7] The configuration of this process allows the use of recycled hydrogen as feed, thus eliminating the hydrogen supply problem.

Steam pyrolysis and hydrogasification are well known gasification processes but have not been considered to be viable technologies for commercial SNG production due to several issues. UCR's CE-CERT has shown that the hydrogasification of carbonaceous matter in the presence of steam significantly enhances the rate of methane formation [8]. This process, called steam hydrogasification, generates a product gas stream with high methane content. The composition of the product gas from steam hydrogasification reaction can be controlled by varying the steam to carbon and the $H_2$ to carbon ratio of the feed. Methane content of the SHR product gas can be varied from 0.2 to 60%; preferably 10-40%, more preferably, 30-60%; more preferably 40-60% on a dry mole basis. The product gas also contains CO, $CO_2$, $H_2$ and considerable amount of unreacted steam.

In present invention of the SHR gasifier, the carbonaceous feed is transported into the reactor in a slurry form, which consists of carbonaceous material that has been chopped, milled or ground into small particles, and mixed with water. Instead of using water to form a slurry, other forms of diluent can be used, such as but not limited to, algae obtained from algae farms (where water comprises a large component of the material), raw sewage waste, and sewage associated products generated from a waste water treatment facility (such as but not limited to, dissolved air floatation thickener (DAFT) and Belt Pressed Cake (BPC)).

A slurry is a mixture of carbonaceous solid material and liquid (preferably water). In various embodiments, the slurry can be pumpable, and can have a solid content to be determined by the technology used to prepared the slurry and also the properties of the feedstock.

In another embodiment the slurry can have a viscosity less than or equal to 1.0 Pa·s or less than or equal to 0.7 Pa·s. The rheological properties of a slurry are dependant on the type of solid material, solid loading, solid particle size and size distribution, temperature, and additives. For example, in some embodiments, the maximum solid loading of coal-water, biomass-water, pretreated biomass-water, and comingled biomass and coal slurries are: a) a maximum solid loading of 65 wt % at 0.7 Pa·s can be achieved for the coal-water slurry, and 12.5 wt % for the biomass-water slurry; b) solid loading in pretreated biomass-water slurry can increase to about 35 wt %, and when comingled with coal, solid loading can increase to about 45 wt %.

The slurry form eliminates the need for cumbersome reactor feed systems such as a lock hopper. This also simplifies feedstock processing since drying the feed is not necessary. A portion of the necessary steam can enter the hydrogasification reactor as liquid water that is part of the slurry and the rest of the steam is superheated, for instance by a steam generator, and fed along with the hydrogen. In another embodiment, all the necessary steam is obtained from the liquid water part of the slurry. In other embodiments, for instance where relatively dry carbonaceous material is being used as the feedstock, all the steam can be generated, for instance using a steam generator, and this fed into the steam hydrogasifier. The steam hydrogasification process can operate without a) reaction catalysts and/or other initiating agents, for instance hot solids; b) without the injection of oxygen (i.e. POX systems, or otherwise) prior to the SHR or during the SHR step; and/or c) without preheating the carbonaceous material prior to entry into the SHR. The aforementioned hot solids typically have melting points in excess of the hydrogasifcation temperatures used, and are used as the heat source for heating up the carbonaceous feed in the hydrogasifier. These solids, can be, but are not limited to, sand, petroleum coke, coal char, ash particles. Moreover, some solids may have catalytic activity for the promotion of hydrogenation. Temperatures range of between 700° C. to about 1200° C., and pressures about 132 psi to 560 psi (preferably between 150 psi to 400 psi) can be used in the steam hydrogasifier. The steam hydrogasifier reactor (and shift reactor) can be batch reactors or fluidized bed reactors.

Process Configurations for High $CH_4$ Syngas Production Using the SHR Gasifier

In one embodiment, steam hydrogasification of any carbonaceous feedstock (not limited to municipal waste, biomass, wood, sub-bituminous coal; high ash coal, biosolids, or a natural or synthetic polymer; or commingled mixtures thereof) generates a product gas with considerable amount of methane compared to conventional partial oxidation gasifiers. Methane production from the SHR (using the above mentioned feedstocks) can be from 0.2 to 60%; preferably 10-40%, more preferably, 30-40%; more preferably 40-60% on a dry mole basis, without the use of downstream processing (such as methanators). In this embodiment, further downstream processing, for instance methanation, is not required for facilitating methane production. In other embodiments, an addition downstream methanation process can be added to the process, as disclosed, to generate even more methane, such as between 0.2-100% methane. Such methanators, and their processes, are well known to those of skill in the art.

In another embodiment, the methane produced from the SHR can be purified so that it is essentially 100% methane.

In one embodiment, all the hydrogen required for the steam hydrogasfication is obtained from the shift reactor (see below). In other embodiments, hydrogen for the steam hydrogasfication can be obtained from an external source (such as using steam reforming of natural gas); and in further embodiments hydrogen can be obtained from the combination of a shift reactor and an external source.

In one embodiment, an SHR can be used without a shift reactor to generate high concentrations of methane. In another embodiment, the steam hydrogasification reactor can be coupled with a shift reactor, resulting in a gasifier configuration that also generates a syngas with high methane concentrations. In this embodiment with the shift reactor, the issue of hydrogen supply has been resolved by recycling a portion of the hydrogen generated by the shift reactor. This configuration also allows considerable control over the final product gas composition.

SHR gasification produces a high methane containing syngas. The slurry made of the carbonaceous feed (coal) and water, along with the recycled hydrogen are fed to the SHR, operating at approximately 850° C. and 400 psi.

The SHR generates a high methane content product gas that—can be subjected to warm gas cleanup in order to remove contaminants such as sulfur. The gas cleanup can be performed at a temperature above the dew (or boiling) point of water. This will allow the unreacted steam from the SHR to be directly fed into the shift reactor along with the product gas. In another embodiment, the gas clean up can be performed at lower temperatures, known to those of skill in the art. In one embodiment, the SHR serves as the sole steam source for the shift reactor, where the steam generated by the SHR is sufficient to supply the shift reactor. In other embodiments, steam for the shift reactor can be obtained from a combination of the SHR and other sources, such as a steam generator. In yet another embodiment, steam for the shift reactor is obtained only from a steam generator.

In the shift reactor, the CO present in the clean product gas reacts with the steam to produce $H_2$. Methane is inert in the shift reactor. This product gas is then cooled down and $H_2$ is separated for recycle to the SHR as feed. The recycle hydrogen stream eliminates the hydrogen supply problem for the SHR. The final product gas contains high quantity of methane.

Operating temperatures for the shift reactor can be a range determined by the best shift reactor technology available. In another embodiment in can be, not limited to be between 200 to 450° C. and at 132 psi to 560 psi (preferably between 150 psi to 400 psi).

In another embodiment, the SHR product gas can be fed into the shift reactor without first undergoing the clean up process. In this case, the shift reactor will be operated as a 'sour-shift' reactor with a special sulfur tolerant catalyst. The final product gas can then be subjected to cleanup under ambient conditions.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process and apparatus described in the specification. As one of ordinary skill in the art will readily appreciate from the disclosure of the present invention, processes and apparatuses, presently existing or later to be developed that perform substantially the same function or achieve substantially the same result as the corresponding embodiments described herein may be utilized according to the present invention. Accordingly, the appended claims are intended to include such processes and use of such apparatuses within their scope.

The following experiments and figures show merely examples of the various feedstocks and/or ranges of methane that can be produced. Such examples should not be used to limit the invention.

FIG. 1 shows the process configuration involving the innovative SHR gasification to produce a high methane containing syngas. The slurry made of the carbonaceous feed (coal) and water, along with the recycled hydrogen are fed to the SHR, operating at approximately 850° C. and 400 psi.

The SHR generates a high methane content product gas that is subjected to warm gas cleanup in order to remove contaminants such as sulfur. This product gas is subjected to cleanup in order to remove contaminants such as sulfur. The gas cleanup must be performed at a temperature above the dew point of water. This will allow the unreacted steam from the SHR to be directly fed into the shift reactor along with the product gas. In the shift reactor, the CO present in the clean product gas reacts with the steam to produce H2. Methane is inert in the shift reactor. This product gas is then cooled down and H2 is separated for recycle to the SHR as feed. The recycle hydrogen stream eliminates the hydrogen supply problem. The final product gas contains high quantity of methane.

Alternatively, the SHR product gas can be directly fed into the shift reactor. In this case, the shift reactor will be operated as a 'sour-shift' reactor with a sulfur tolerant catalyst. The final product gas can then be subjected to cleanup under ambient conditions.

Experimental Results

Steam hydrogasification experiments have been conducted in a stirred batch reactor. A batch reactor setup with a reactor volume of 220 cc was used for these experiments. The reactor was specifically designed to enable continuous stirring under high pressures. The reactor is made of Inconel® alloy and can be operated at pressures and temperatures as high as 400 psi and 800° C. respectively. The setup was comprised of an electrical heater, the reactor vessel, a motor driven stirrer, a moisture condenser, a capillary line (0.005" I.D. and 10 m long) that allowed the reaction product gases to be analyzed in real time using a Residual Gas Analyzer (RGA—Cirrus quadrupole) and a chiller for circulating cooling water. The product gases from the reactor were analyzed in real time through the use of the capillary line and the RGA. All the tests were conducted with two grams of feed and the amount of liquid water necessary for the desired H2O/Feed mass ratio. The feed materials were sub-bituminous coal from the southern Utah region and cedar wood. The feed material was ground to a size of 100 µm. The carbon conversions were calculated by measuring the char and ash left over after each experiment. The carbon conversion at 800 C. operating temperature was in the range of 70 to 80% and at an operating temperature of 700 C., the conversion was approximately of 60% for all the samples. A detailed discussion of the experimental procedure and results are reported elsewhere, including results for different coal samples [9-11].

Simulation Results

A detailed process model using Aspen Plus version 2006.5 was developed and used to predict process behavior, mass and energy balances. Aspen Plus is a well known simulation tool [12] that has the ability to handle non-conventional feed stocks and process streams using built-in process units and physical/chemical property databases. A brief description of the original process model used to perform the simulations is given below.

The model simulates the steam hydrogasification reactor (SHR) using decomposition and gasification units. Each unit is based on built-in Aspen reactor blocks that calculate the equilibrium composition in the reactor under the given conditions by means of Gibbs free energy minimization. The decomposition block converts the non-conventional feedstocks such as biomass or biosolids into its basic elements on the basis of yield information using the RYIELD block and the gasification block calculates the equilibrium product gas composition using the RGIBBS block. The feedstock is mixed with water and the resulting slurry is fed into the SHR block along with the H2 at predetermined H2/C mole ratio and water/feed mass ratios. The carbon conversion information is provided by the user based on experimental results [13]. The ash and unreacted char are removed from the reactor in a solids stream and the product gas is subjected to gas cleanup in order to remove the sulfur. Other contaminants such as heavy metals are not considered in these simulations. The clean product gas then enters the Shift Reactor. The Shift Reactor was simulated using a built-in equilibrium block. The product gas from the Shift Reactor is then sent through a separator where the excess H2 is removed for recycle to the SHR.

The Aspen Plus model calculates the details such as the material balance, the energy balance, product composition, etc. based on user defined input parameters such as the feedstock composition, temperature, pressure, flow rates, etc.

The composition of the SHR product gas can be controlled by varying the H2/C and the H2O/C ratios of the feed along with other parameters such as temperature, pressure and residence time. This advantage enables the process to improve the concentration of the desired product gas to a reasonable extent. Aspen Plus based simulations have been used to determine the effect of the feed ratios and pressure on the methane concentration of the SHR product gas. For convenience, the H2/C feed ratio is defined on the molar basis as the ratio of H2 gas supplied to the SHR to the carbon in the feed (H2/C Feed Mole Ratio). The H2O to carbon ratio is defined on a mass basis as the ratio of H2O supplied into the reactor to the mass of the dry carbonaceous feed (H2O/Feed Mass Ratio).

Figure 3:
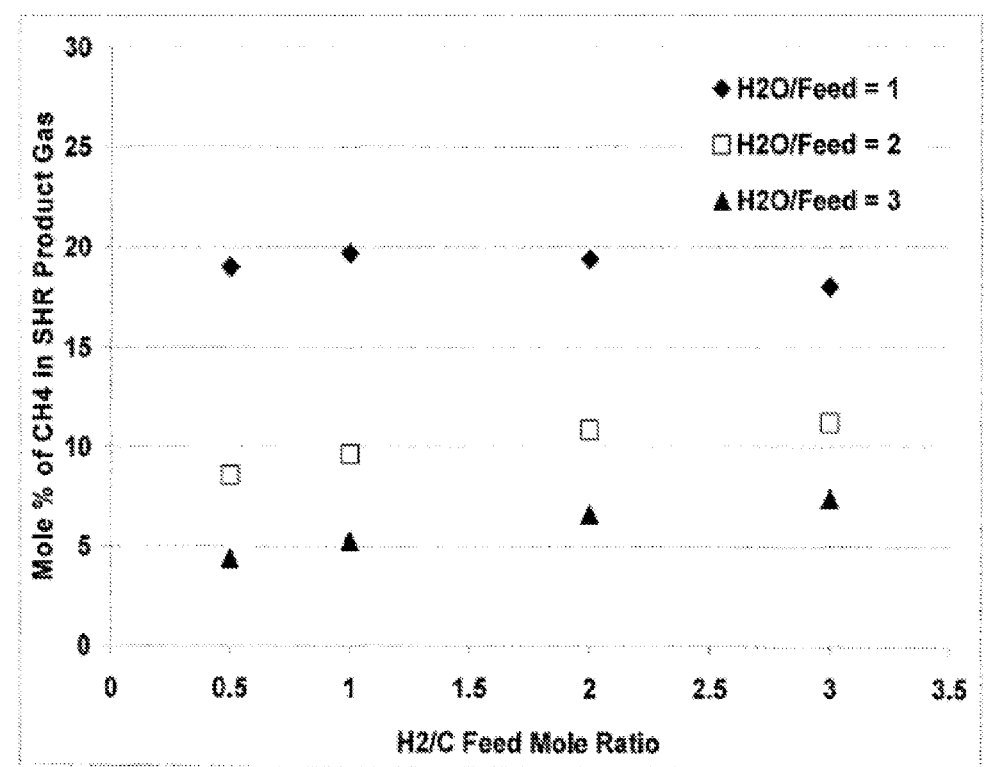
FIGS. 3 and 4 show the mole % of methane in the SHR product gas for varying H2/C and H2O/Feed ratios at 200 and 400 psi operating pressures, respectively.
Figure 4:
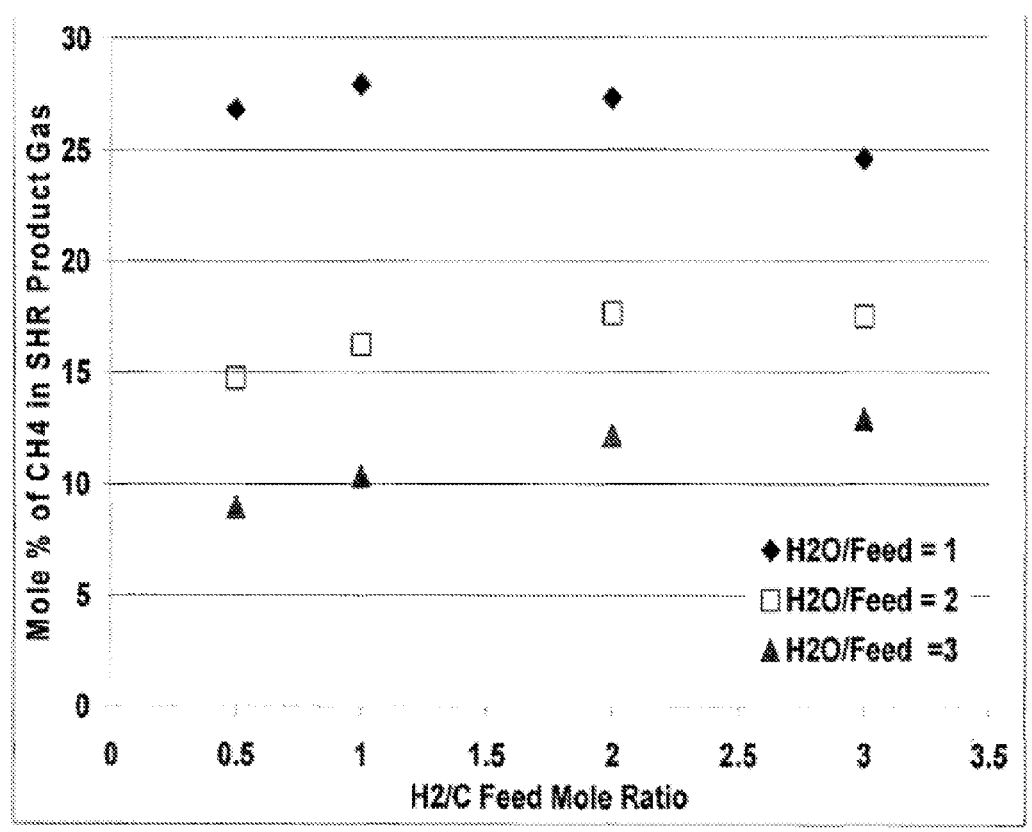

FIGS. 3 and 4 show the mole % of methane in the SHR product gas for varying H2/C and H2O/Feed ratios at 200 and 400 psi operating pressures respectively. The operating temperature was set at 850 C. for both cases. The concentrations were calculated on a dry basis. It can be seen that the methane concentration varies over a wide range for different feed ratios. It is important to identify the optimal feed composition based on the desired product gas composition and also the overall efficiency of the process. From the results, it can also be seen that the methane concentration increases with increasing pressures.

Figure 5:
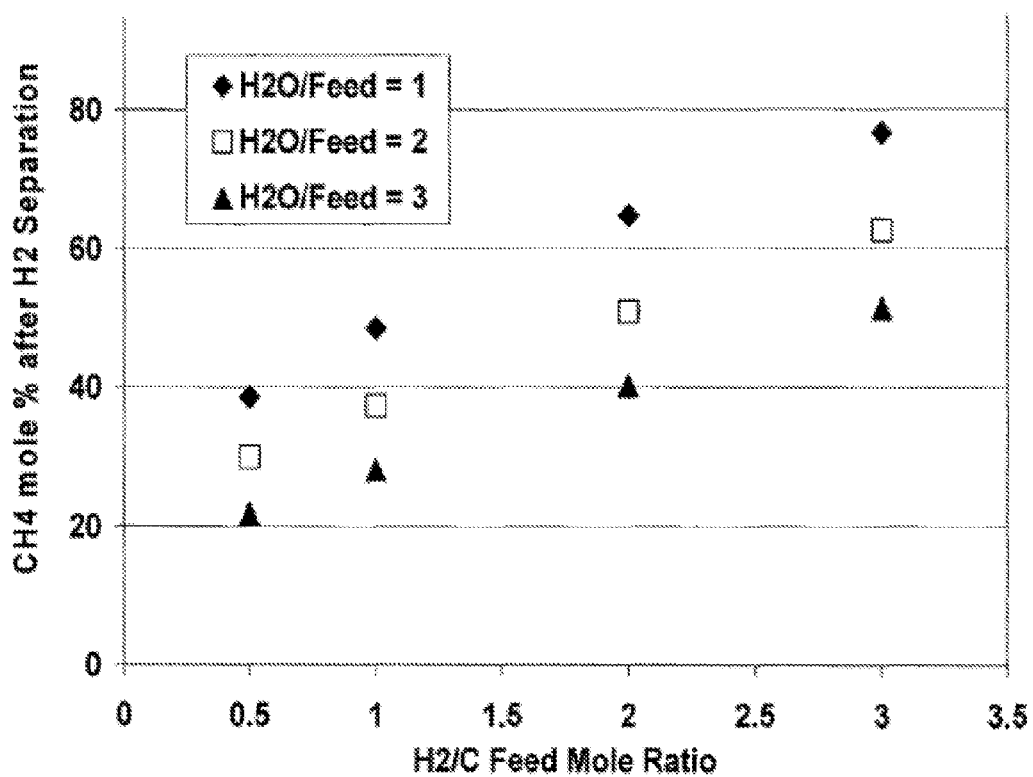
FIG. 5 shows the molar concentration of methane in the final product gas.

FIG. 5 shows the molar concentration of methane in the final product gas. This concentration is calculated after the separation of H2 for recycling back to the SHR gasifier. The pressure was set at 400 psi for both the SHR and the Shift Reactor. The operating temperature of the SHR was set at 850 C. and the Shift Reactor at 350 C. It can be seen that the final product gas contains significant quantities of methane. The methane concentration of the product gas can be further improved by means of methanation.

Figure 6:
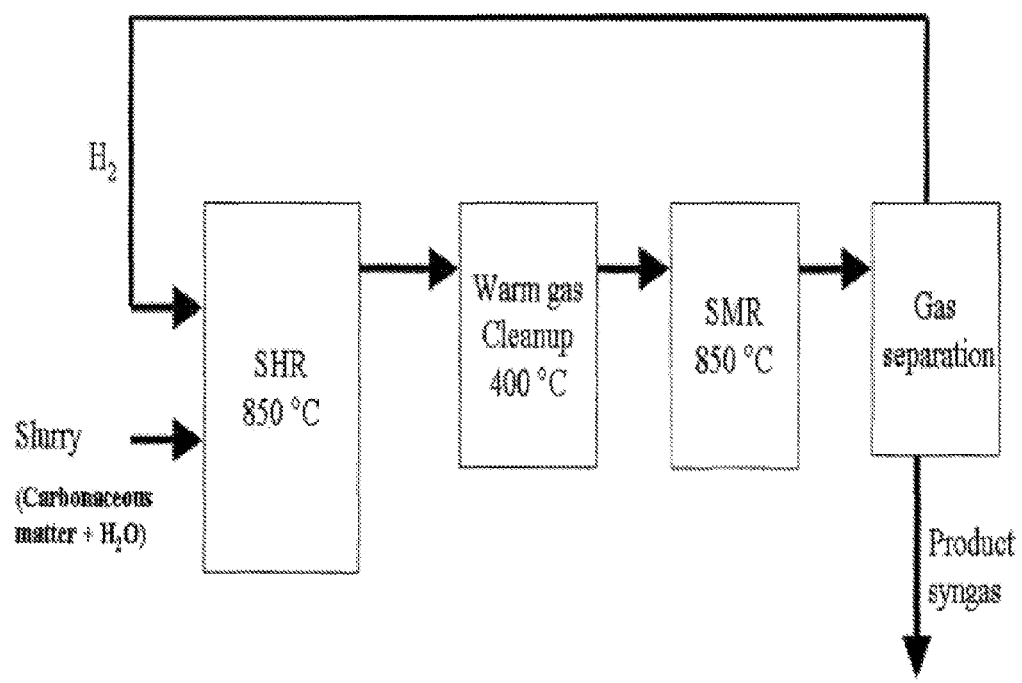
FIG. 6 shows an alternative schematic for the SHR based high methane gasification system.

3.2.2 Methane as Intermediate Product Followed by Syngas Production for Fischer-Tropsch or Fuel Cell Applications An alternative schematic for the SHR based high methane gasification system is shown in FIG. 6. This schematic is given the name Configuration B. The SHR product gas is subjected to warm gas cleanup and is fed to a Steam Methane Reformer (SMR), which converts the methane and the unreacted steam to H2 and CO. H2 to CO ratios (syngas ratio) in the SMR product gas may range from 3 to 5 [7]. However, syngas ratios required for typical downstream processes such as Fischer-Tropsch synthesis are in the range of 1 to 2. The excess H2 in the SMR product gas can be separated and recycled back to the gasifier, eliminating the H2 supply problem. This configuration is ideal if the final target product is syngas instead of methane.

The shift reactor, SMR, gas cleanup and gas separation processes are well established commercial processes. The focus of this research project is limited to the SHR gasifier with the optimal integration into the above-mentioned configurations in mind.

4. Feedstock Selection

The feedstock chosen for this study is sub-bituminous coal mixed with high ash coal or biomass. The sub-bituminous coal has been selected as the representative coal feedstock for gasification processes.

4.1 Sub-Bituminous and High Ash Coal Mixtures

While the sub-bituminous coal is an excellent feedstock for gasification purposes, low grade coal with high ash content in the range of 30-50% is not considered to be suitable for gasification or other purposes and is often left unused. Our laboratory has performed steam hydrogasification of this high ash coal in batch and flow reactors and high carbon conversions have been demonstrated. The use of this low grade coal will contribute to the development of a valuable energy source which may otherwise be wasted. The high ash coal added to the feedstock will be as high as 50% by weight on a dry basis. The optimum ratio of sub-bituminous coal to high ash coal will be determined as part of objective 3 and 4 through slurry pumpability and conversion efficiency results.

4.2 Comingled Sub-Bituminous Coal and Biomass Mixtures

Coal has several obvious advantages as a gasification feedstock due to its high carbon content, abundance, good slurry properties, etc. However, the GHG emissions from coal based pathways are considerably higher than that of conventional gasoline and diesel. The capture and storage of $CO_2$ from fuel or electricity production facilities is becoming a topic of interest, especially for coal based technologies. The research on commingled gasification of coal and other renewable feedstocks such as biomass, sewage sludge, etc is receiving increased attention since this offers several advantages. Commingled gasification can considerably reduce the life cycle $CO_2$ emissions of the fuel [10]. If a large amount of renewable feedstock such biomass is mixed with coal feed in a FT liquid fuel production facility, the net life cycle $CO_2$ emissions of the FT diesel fuel can be the same as or even less than that of petroleum based diesel fuel [11]. The production of high methane product gas through the comingled steam hydrogasification of coal and wood mixtures have been demonstrated by our research group in a stirred batch reactor[12]. The biomass added to the feedstock can be as high as 50% by weight on a dry basis. The optimum ratio of coal to biomass will be determined as part of objective 3 and 4 through slurry pumpability and conversion efficiency results.

D. Anticipated Public Benefits

The proposed high methane gasifier will produce methane from abundant domestic feedstocks such as sub-bituminous and low grade coal in a cost effective manner. Methane can be used for a number of purposes as a clean burning fuel, including as a transportation fuel. As mentioned earlier, the United States is the leading importer of natural gas in the world in addition to considerable amount of domestic production.

The usage of low grade coal with high ash content in the feedstock will provide a means to develop a valuable domestic energy source. In addition, the use of biomass comingled with coal will result in reduced greenhouse gas emissions compared to a coal based methane production plant.

Figure 7:
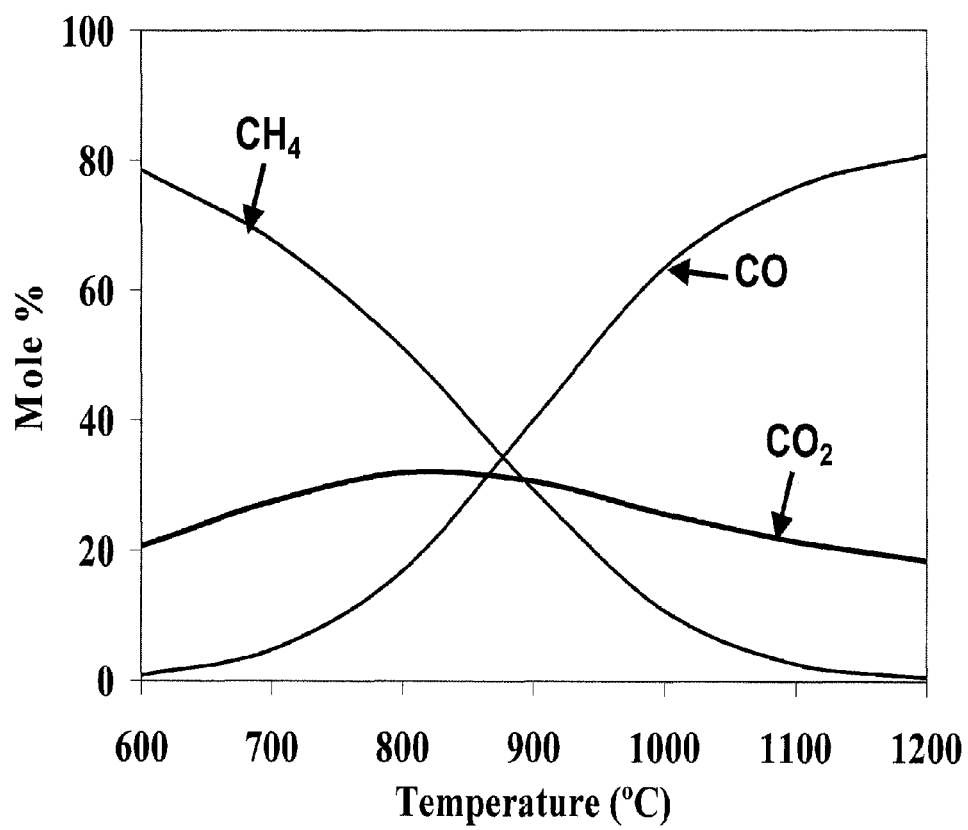
FIG. 7 shows the effect of temperature on the steam hydrogasification of coal.

Aspen Plus based SHR simulations have been used to perform equilibrium calculations of the steam hydrogasification process. This simulation was developed for processing non-conventional feedstock such as wood, coal and other carbonaceous matter [26]. The equilibrium calculations are performed on the basis of Gibbs free energy minimization using built-in Aspen Plus reactor modules. The simulation has been used to estimate the equilibrium gas compositions for different feedstock compositions and also to estimate the effect of pressure and temperature on the process. The feed H2O/feed ratios were calculated on a mass basis and the feed H2/C ratios were calculated on a mole basis. The feedstocks chosen were sub-bituminous coal from southern Utah (~70% carbon content by weight) and cedar wood (~50% carbon content by weight). The effect of temperature on the steam hydrogasification of coal is given in FIG. 7. The pressure was at 400 psi and the carbon conversion was assumed to be at 80%, although this may not be the case in reality. The carbon conversion was defined as the amount of carbon in the feedstock that is converted into gaseous products [26]. The H2O/Feed mass ratio was equal to 2 and the H2/C feed mole ratio was at 1. The equilibrium calculations were performed under the assumption that all the carbon in the product gases was present in the form of CO, $CO_2$ or $CH_4$. The mole percentages presented here were calculated using these three species only. Other components present in the product gas such as unreacted steam and hydrogen were not included in the product mole percentage calculations. Hence, the mole percentages presented have been normalized to 100% based on the three carbon containing species, CO, $CO_2$ and $CH_4$.

The concentration of methane decreases with increasing temperature whereas the concentration of CO increases. This can be expected since the hydrogenation of carbon which is the primary methane generation reaction is mildly exothermic. The CO producing reactions such as the RWGS reaction are endothermic, and result in an increase in the concentration of CO as the temperature increases. It can be seen that $CO_2$ has a maximum concentration in the temperature range of roughly 800-900° C. for all the feedstocks. This can be attributed to the water gas shift reaction which is reversed under higher temperatures. Since these results are based on assumptions of equilibrium, it is not meaningful to relate these to experimental data from a batch reactor. However, equilibrium data can be used to design experiments and also to evaluate and understand process behavior in large scale steady state reactors. It is well known that due to the differences in the compositions, coal, wood and other solid hydrocarbon feedstocks must be treated as different fuels and reactors must be designed in relevance to the desired feedstock [27]. Hence, experimental work is important in order to develop a better understanding of the behavior of the desired feedstocks.

3. Experimental Section

The gasification tests of coal and wood mixtures have been conducted in a stirred batch reactor. The purpose of these tests was to determine the carbon conversion and also the rates of formation of different product species. The tests were conducted at 800° C. and the initial pressure was set at 100 psi for all the tests [26]. The experimental setup and the test procedure are discussed in detail in the following sections.

Experimental Procedure and Data Analysis

A stirred batch reactor system with a volume of 220 cc was used for this investigation. The reactor was made of inconel alloy and the setup can allow a maximum operating pressure and temperature of 500 psi at 800° C. The reaction product gases were analyzed in real time using a Residual Gas Analyzer (RGA—Cirrus quadrupole). The product gases from the reactor were analyzed in real time through the use of the capillary line and the RGA. All the tests were conducted with two grams of feed and the amount of liquid water necessary for the desired H2O/Feed mass ratio. The feed materials were sub-bituminous coal from the southern Utah region and cedar wood. The feed material was ground to a size of 100 μm.

The feed sample was loaded into the reactor vessel along with the desired amount of water and the reactor was heated by immersing it into a tubular electrical heater at the start of the test. The reactor was connected to the RGA throughout the test. Once the reactor reached room temperature after the test, the vessel was removed and the unreacted char and the ash left over were carefully collected and weighed. The carbon content of the left over char and ash mixture was estimated by assuming that all the char is present as elemental carbon and also that all the ash is retained in the solids left over in the reactor. Selected samples were analyzed using a Thermo Gravimetric Analyzer (TGA) in order to confirm the estimated carbon and ash content of the left over solids. The results of the TGA tests agreed well with the estimated carbon and ash contents. The carbon conversion of each gasification test was calculated based on the weight of the char left over after the tests using the formula given below.

$$\text{Carbon conversion (\%)} = \left(1 - \frac{\text{Carbon left over after the test}}{\text{Carbon content of feed}}\right) \times 100 \quad (4.1)$$

Stirred Batch Reactor Results and Discussion

Figure 8:
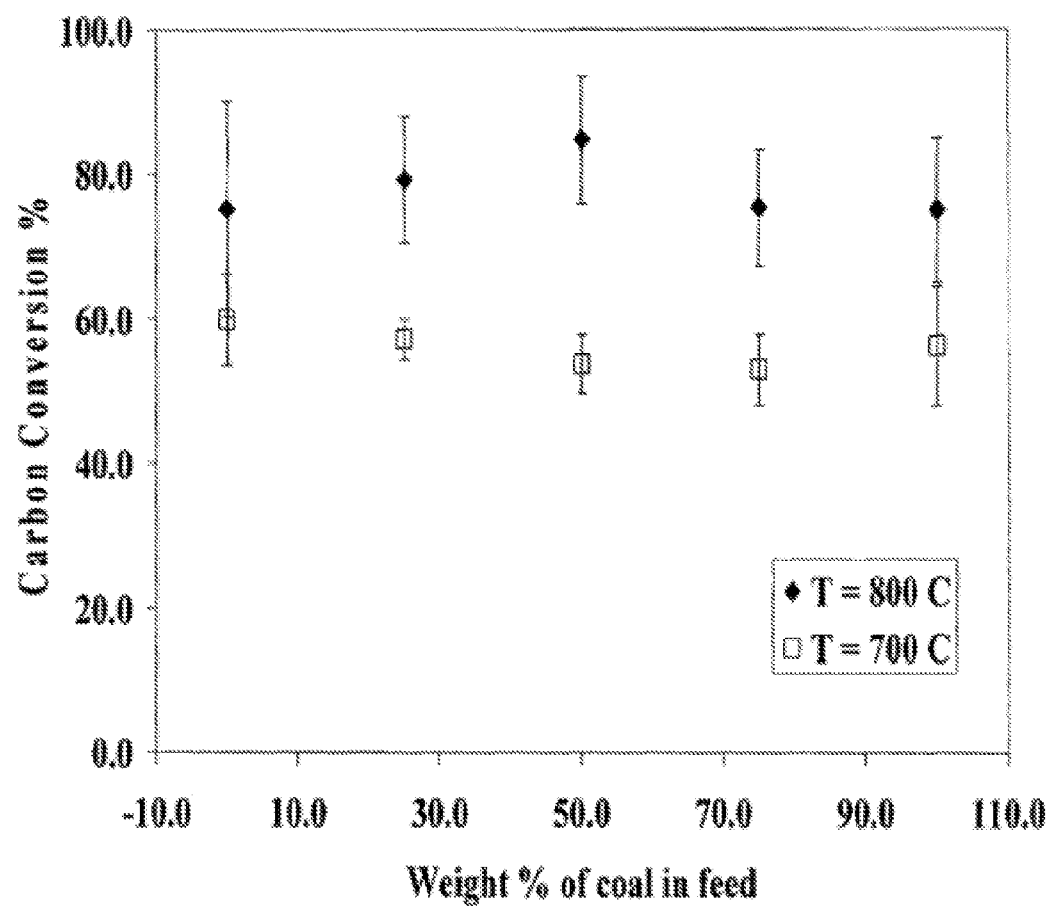
FIG. 8 shows the carbon conversion for different commingled feed SHR gasification tests at 700 and 800° C.

The coal wood co-gasification experiments presented here were conducted at 800° C. and also at 700° C. The carbon conversion was estimated for each test and the kinetic data were also collected [26]. Steam pyrolysis and hydrogasification tests were also conducted in addition to SHR tests in order to evaluate the effect of steam and H2 on the gasification process. The H2O/Feed mass ratio was equal to 2 and the tests were conducted in a H2 environment at an initial pressure of 100 psi for all the SHR tests. The steam pyrolysis experiments were conducted in a nitrogen environment with an initial pressure of 100 psi. The hydrogasification tests were conducted in a H2 environment of initial pressure 100 psi but no water was added to the feed. The weight percentage of coal in the feed was varied from 0 to 100%, where 0% indicates an only wood feed and 100% indicates an only coal feed. The carbon conversion for different commingled feed SHR gasification tests at 700 and 800° C. are given in FIG. 8.

Figure 9:
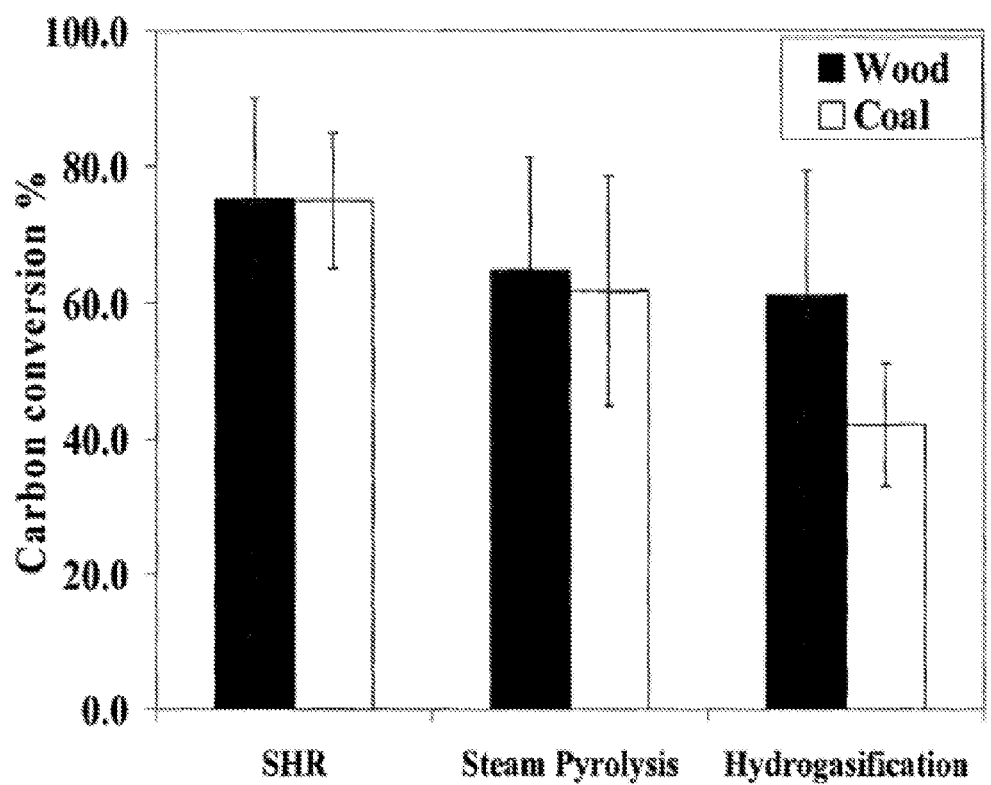
FIG. 9 shows a graph showing comparison of carbon conversions for SHR, steam pyrolysis and hydrogasification tests at 800° C.

The results show that the carbon conversion remains relatively the same for different coal wood compositions of the feed and synergistic increase in the conversion was not observed [26]. These results are in agreement with previous commingled gasification reports including that of Collot et al. [19] and Kumabe et al. [20]. As expected, the carbon conversion increases with an increase in the reaction temperature. The carbon conversion values at 700° C. are approximately around 60% whereas at 800° C., the values are closer to 80%. The comparison of carbon conversions for SHR, steam pyrolysis and hydrogasification tests at 800° C. are presented in FIG. 9.

The results show that the simultaneous presence of steam and hydrogen improves the carbon conversion for both coal and wood feedstocks [26]. As can be expected, the carbon conversion of wood is slightly higher than coal and the difference between conversions of coal and wood is more significant in the case of hydrogasification. This can be attributed to the higher reactivity of wood, due to its higher oxygen and volatile matter content. The carbon conversion improves with an increase in temperature for all the three cases. The carbon conversions achieved through steam pyrolysis, especially for wood, are higher than hydrogasification conversions, but are slightly lower than steam hydrogasification conversions.

It has been shown that steam enhances the reactivity of carbonaceous feedstocks and also results in the increased production of gases during gasification [8, 28]. Jeon et al. [8] have reported that the addition of steam resulted in higher reactivity and higher carbon conversion of the feedstock compared to dry hydrogasification. Dufaux et al. [29] conducted underground in situ gasification of coal using air and water as the gasification agent. Heavy water tracing tests were conducted in order to determine the origin of the methane and hydrogen produced during gasification. It was suggested that the coal was in a distillation (pyrolysis) zone and a gasification zone and the contribution of the distillation zone to the total methane production was negligible. The heavy water tracing indicated that almost all the methane was produced directly from the chars in the gasification zone and the volatiles from coal had no contribution. It has been suggested that besides reacting with the pyrolysis products, water vapor also acts as a vehicle for the volatiles [28] during gasification. Water vapor has the ability to enhance the distortion and distillation of coal by penetrating the solid surface. Thus, water vapor increases the volatile yield by stabilizing the radicals produced by thermal decomposition of the feed. During low temperature pyrolysis of heavy hydrocarbons such as kerogen, it was found that the presence of water inhibits carbon-carbon linking [30]. This resulted in a product that indicated a radical free mechanism, with n-alkanes predominant over iso-alkanes. Water acts as an exogenous source of hydrogen, thus promoting thermal cracking. Hence, it can be said that water plays a critical role in the thermo-chemical conversion of the feedstock through chemical reactions and also by influencing the thermal decomposition of the feed. The improved carbon conversions during steam hydrogasification compared to dry hydrogasification may be attributed to the enhanced reactivity of the feedstock through thermal decomposition by steam. However, it is not possible to verify this hypothesis using the current experimental setup.

4. Summary

Steam hydrogasification experiments of commingled coal and biomass feedstocks have been performed in a stirred batch reactor. The carbon conversions have been estimated based on the amount of unreacted char left over after the experiment. The results show that the carbon conversion is not influenced by the coal to wood ratio of the feedstock. Steam pyrolysis and hydrogasification tests were also conducted with coal and wood feedstocks in order to evaluate the influence of steam and H2 on carbon conversion and kinetic data. The results show that the carbon conversion improves under the simultaneous presence of steam and H¬2. The experimental and simulation results show that although the carbon conversions are not significantly affected by the coal to wood ratios of the feed, the product gas compositions are different and the energy requirements and efficiencies will vary. However, these experiments have been performed in a batch reactor. As mentioned earlier, the co-gasification of coal and biomass or other coal mixtures is not a straightforward process and it is very important to perform experimental work for specific feedstocks under desired conditions. Experimental in a kiln type flow reactor will be performed as part of this proposal, focusing on the carbon conversion and product gas composition during the steam hydrogasification of the desired feedstocks.

A process for the production of methane rich fuel gas from carbonaceous feedstocks has been evaluated using simulations. The feedstock is gasified in the presence of steam and hydrogen and the product gas is then subjected to shift conversion. The product gas can either be subjected to gas cleanup before the shift reactor or can be used in a sour shift reactor without cleanup. Experimental results of the steam hydrogasification of coal and wood mixtures in a batch reactor are presented. The carbon conversion values at 700° C. were approximately around 60% whereas at 800° C., the values were closer to 80%. The simulation results show that the product gas from an SHR gasifier contains considerable amounts of methane. The concentration of methane increases with decreasing H2O/Feed mass ratio and increasing H2/C feed mole ratio. Operating at higher pressures also favors an increase in methane production. The methane concentration of the product gas from the shift reactor ranges from 20 to 70%. The optimal operating conditions such as the H2/C & H2O/Feed ratios, temperature and pressure must be evaluated based on a number of parameters including the desired product gas composition, overall process efficiency and the amount of H2 necessary for recycle back to the SHR. This process can produce methane from abundant domestic feedstocks such as sub-bituminous and low grade coal in a potentially cost effective manner.

REFERENCES

The following publications are incorporated by reference herein in their entirety:

[1] "Key World Energy Statistics," International Energy Agency 2008.

[2] J. L. Figueiredo and J. A. Moulijn, Eds., Carbon and Coal Gasification (NATO ASI Series. Martin Nijhoff Publishers, 1986, p. ^ pp. Pages.

[3] C. Higman and M. van der Burgt, Gasification: Elsevier, 2003.

[4] P. L. Walker Jr., et al., "Gas reactions of carbon," Advances in Catalysis, vol. 11, pp. 133-221, 1959.

[5] E. P. Deurwaarder, et al., "Methanation of Milena product gas for the production of bio-SNG," presented at the 14th European Biomass Conference & Exhibition, Paris, France, 2005.

[6] J. M. Norbeck and C. E. Hackett, "Production of synthetic transportation fuels from carbonaceous material using self-sustained hydrogasification," USA Patent, 2007.

[7] A. S. K. Raju, et al., "Synthesis gas production using steam hydrogasification and steam reforming," Fuel Processing Technology, vol. 90, pp. 330-336, 2009.

[8] S. K. Jeon, et al., "Characteristics of steam hydrogasification of wood using a micro-batch reactor," Fuel, vol. 86, pp. 2817-2823, 2007.

[9] A. S. K. Raju, "Production of Synthetic Fuels Using Syngas from a Steam Hydrogasification and Reforming Process," Ph.D., Chemical Engineering, University of California Riverside, Riverside, 2008.

[10] A. S. K. Raju, et al., "Steam Hydrogasification of Coal-wood Mixtures in a Batch Reactor," presented at the The 25th Annual International Pittsburgh Coal Conference, Pittsburgh, 2008.

[11] Y. J. Tan, et al., "Steam Hydrogasification of Lignite Coal," presented at the The 26th Annual International Pittsburgh Coal Conference, Pittsburgh, 2009.

[12] AspenTech. (2008), www.aspentech.com.

[13] C. S. Park, et al., "Steam hydrogasification of carbonaceous matter to liquid fuels," presented at the The 24th Annual International Pittsburgh Coal Conference, Johannesburg, South Africa, 2007.

The invention claimed is:

1. A process for converting carbonaceous material in an aqueous slurry into a product gas, comprising:
   simultaneously heating in a hydrogasification reactor the carbonaceous material in the aqueous slurry in the presence of both hydrogen and steam, at a temperature and pressure sufficient to generate a product stream comprising methane, a carbon monoxide rich product gas and unreacted steam, wherein heating of the aqueous slurry produces the unreacted steam, and wherein methane content is controlled in the product stream by varying a steam to carbon ratio and a hydrogen to carbon ratio;
   feeding the product stream at a temperature above a dew point of water to a shift reactor to generate a shift reactor effluent stream, wherein carbon monoxide reacts with the unreacted steam to produce H2, and wherein the unreacted steam is fed to the shift reactor in an amount sufficient to meet at least a portion of a steam demand of the shift reactor;
   directly feeding the shift reactor effluent stream to a gas separator to remove at least some of the H2 to thereby form the product gas having a quantity of methane between 20 to 70 mol %; and
   feeding the product gas to a methanator to increase the quantity of methane.

2. The process of claim 1, wherein the heating is performed without an injection of oxygen prior to the heating.

3. The process of claim 1, whereby methane content of the product stream is between 10 to 40% on a dry mole basis.

4. The process of claim 1, whereby methane content of the product stream is between 30 to 60% on a dry mole basis.

5. The process of claim 1, wherein the heating is performed without a catalyst.

6. The process of claim 1, wherein the heating is performed without the injection of oxygen during the heating.

7. The process of claim 1, further comprising removing impurities from the product stream at the temperature above the dew point of water prior to feeding the product stream to the shift reactor.

8. The process of claim 1, wherein the hydrogasification reactor is operated at a temperature between 700-1200 °C.

9. The process of claim 1 wherein the carbonaceous material comprises municipal waste, biomass, wood, coal, high ash coal, biosolids, or a natural or synthetic polymer; or any combination thereof.

10. The process of claim 1, wherein the shift reactor is operated at a temperature between 200-450 °C.

* * * * *